United States Patent

Cowan

[15] 3,701,089
[45] Oct. 24, 1972

[54] DISPLAY FOR MULTI-CHANNEL SONARS

[72] Inventor: John G. Cowan, Panama City, Fla.

[73] Assignee: The United States of America as represented by the Secretary of the Navy

[22] Filed: Oct. 20, 1970

[21] Appl. No.: 82,247

[52] U.S. Cl. .................................340/3 R, 340/3 C
[51] Int. Cl. .................................................G01s 9/66
[58] Field of Search ...............................340/3 C, 3 R

[56] References Cited

UNITED STATES PATENTS

3,001,190  9/1961  Fryklund....................340/3 C

Primary Examiner—Richard A. Farley
Attorney—Richard S. Sciascia, Don D. Doty and William T. Skeer

[57] ABSTRACT

This invention discloses an improved visual display arrangement incorporated in and uniquely combined with a multi-channel sonar system. The arrangement is characterized as having a low persistance cathode ray tube with low direct current potential on the grid thereof. Improved sweep drive using electromagnetic deflection and an improved magnetic focusing arrangement contribute to the operation thereof. A direct coupled video amplifier and a regulated high voltage power supply complete the novel display arrangement.

10 Claims, 6 Drawing Figures

JOHN G. COWAN
INVENTOR

By William A. Skeer
Agent

Dix A. Doty
Attorney

FIG. 3

JOHN G. COWAN
INVENTOR

FIG. 4

JOHN G. COWAN
INVENTOR

FIG. 6

DISPLAY FOR MULTI-CHANNEL SONARS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention pertains to an improved sonar system. More particularly, this invention pertains to an improved multi-channel sonar system having an improved readout arrangement. Further, this invention pertains to an improved cathode ray tube display employing a magnetic sweep and direct coupling of the video signals thereto.

A persistent problem with prior art sonar receiver systems has been their limited dynamic range and their inability to accurately display signals having very low frequencies. As an example of operating conditions giving rise to such problem displays, consider a multi-channel sonar system operating in close proximity to the bottom such that a strong bottom return is present in a plurality of channels simultaneously. As the receiver channels are sequentially scanned by the readout system, a very strong signal of very low frequency, on the order of direct current (DC), is presented to the display for the channels having the bottom signal present therein. Small signals, such as might correspond to an underwater mine casing or an oil well head located in close proximity with strong signals, are lost due to display overload or blockage.

Various prior art attempts to avoid this condition have resulted in systems that have other serious limitations. Operator tiring flicker rate and low dynamic range, which limit the range of target brightness, are the most commonly encountered and compromise shortcomings of the prior art display systems. Prior to this invention, no satisfactory solution to eliminate these shortcomings in a readout system for multi-channel sonars had been devised.

SUMMARY OF THE INVENTION

This invention provides a multi-channel sonar with a readout having a high dynamic range and free from annoying flicker. This is achieved by employing a buffer memory which is rapidly scanned and presented on a direct coupled cathode ray tube display having direct coupling of the video signal combined with magnetic sweep deflection and focusing circuits. A regulated high voltage power supply completes the circuitry of the display system of the invention.

In view of the foregoing discussion of the prior art and the summary of the invention, it is an object of this invention to provide an improved sonar system.

A further object of this invention is the provision of an improved multi-channel sonar system having an improved signal display.

Another object of this invention is to provide a multi-channel sonar system having a display with improved dynamic range.

Still a further object of this invention is the provision of a sonar display system able to resolve a small target adjacent to a large target return.

Yet another object of this invention is the provision of a sonar system having improved video response capabilities.

Another object of this invention is the provision of a cathode ray display having improved deflection and focus circuitry and suitable for multi-channel sonar applications.

Another object of this invention is a sonar readout device having magnetic focus and deflection circuitry combined with direct coupled video presentation.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
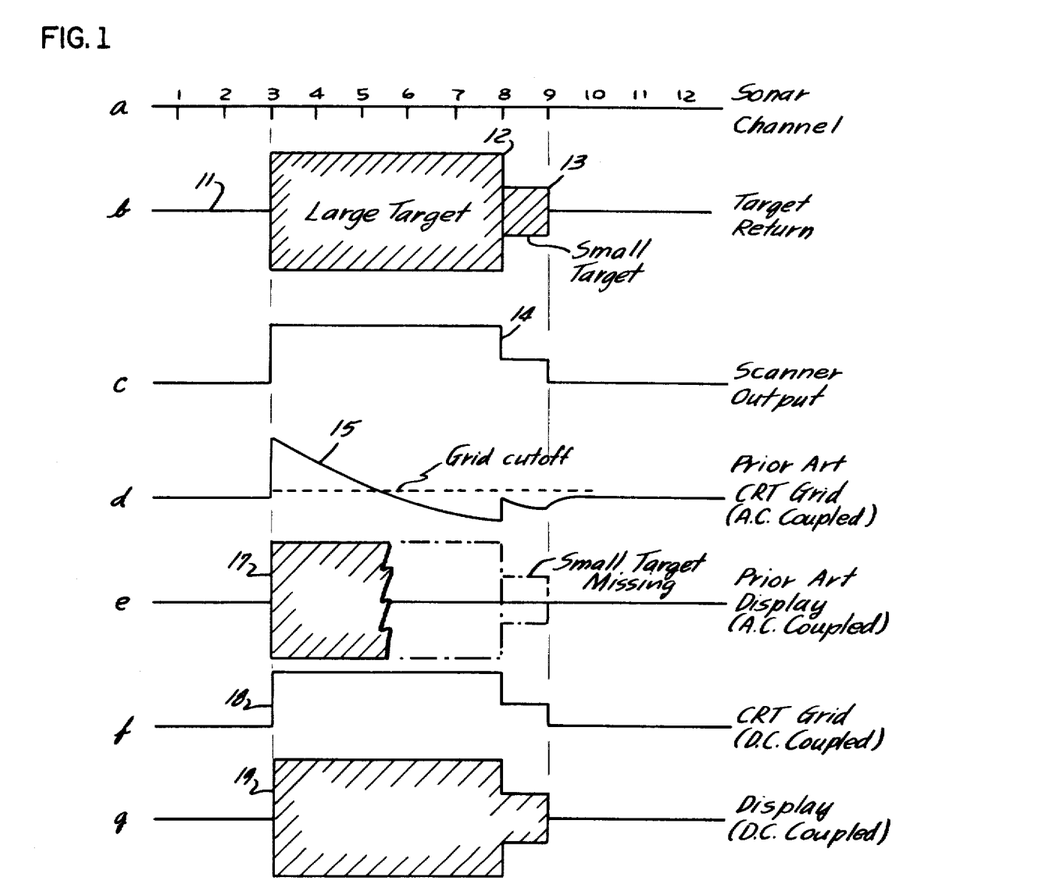
FIG. 1 is a waveform diagram where the operational waveforms are displayed in relation to the prior art devices.

Referring to FIG. 1, the operational parameters referred to above may be more clearly understood. FIG. 1a shows the channel segment divisions of a time scan for a multi-channel sonar. 13 channels are shown for purposes of illustration, but, in practice, many more are used to establish a complete search sector.

FIG. 1b illustrates a target return signal 11 which corresponds to a short time scan of the returns in the respective sonar channels. A large target signal 12 is shown as corresponding to the returns in channels three to eight. A small target return signal 13 is shown in channel number eight. It will be noted, that the envelope of large target signal 12 and small target signal 13 combine to produce a step waveform 14 as shown by FIG. 1c. FIG. 1c may be regarded as the output of the channel scanner, or the basic video signal.

Cathode ray tube display arrangements of the type previously employed in multi-channel sonar system required capacitive coupling to the cathode ray tube grid. This method of signal input was necessitated by the high voltages on the cathode ray tube grid and cathode inherent with electrostatic deflection and focusing arrangements. These coupling arrangements, which are designed to pass the fast rise time edges of the signals, are less effective with the long duration envelope portions, which are, for practical purposes, direct current. The resulting grid waveform 15, shown at FIG. 1d, tends to go below the grid cut-off potential 16. This results in a display 17, FIG. 1e, which gradually fades out as the cathode ray tube is driven to cut-off conditions. As a result, the full extent of large target signal 12 is not displayed and the small target signal 13 is missing altogether.

As will be more fully explained herein, the system of the invention couples the video signal directly to the grid or cathode of the cathode ray tube resulting in grid waveform 18, FIG. 1f. The cathode ray tube display 19, FIG. 1g, produced by grid waveform 18 is of uniform density and shows both large and small target returns.

The precise manner in which these objects may be obtained will be more clearly explained in the description of the system configuration and the preferred circuitry of the component parts thereof. Applicant is, of course, aware that direct coupled cathode ray tube circuits have been employed previously for a variety of applications and is alleging no particular novelty to the concept of direct coupling per se. Rather, Applicant regards as his contribution to the art the specific circuitry arrangements, now to be described. This particular circuitry, when in combination with a multi channel sonar system, produces results heretofore unobtainable.

Figure 2:
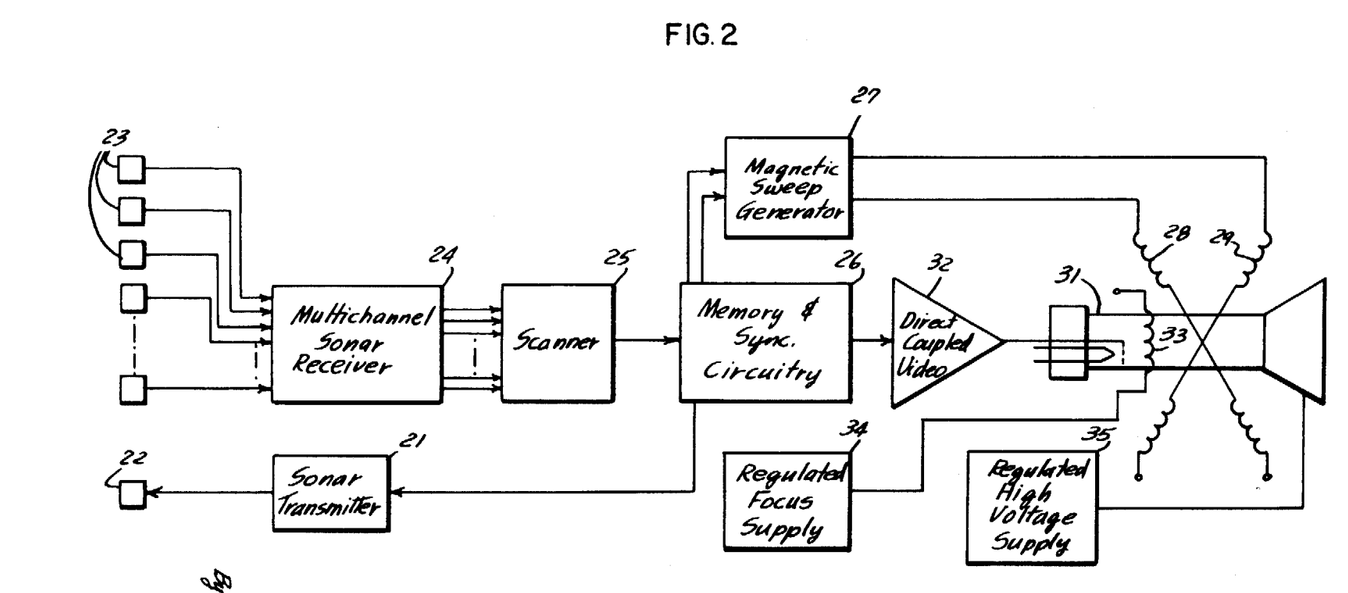
FIG. 2 is a block diagram of the sonar system of the invention.

Referring to FIG. 2, the block diagram of the improved sonar system of the invention is seen to comprise a sonar transmitter 21. An ensonifying transducer 22 is connected to the transmitter to be driven thereby. The acoustic energy emanating from transducer 22 ensonifies a spatial volume in the well understood fashion. Objects therein reflect energy which, in turn, impinges upon hydrophones 23. Hydrophones 23, which is the exemplary embodiment illustrated are equal in number to the number of channels in the system, convert the reflected acoustic energy into electrical signals.

Each hydrophone 23 is connected to a channel of a multi-channel receiver 24. In turn, the outputs of receiver 24 are connected to a scanner 25 which, as previously noted, converts the individual channel outputs to a time varying signal. Conventional memory and synchronizing circuitry 26 is connected to scanner circuit 25 to receive the output therefrom. Memory and synchronizing circuit 25 includes a master oscillator, or clock circuit, and, as is well understood in the ranging arts, provides the coordinating signals for the sonar system. One such signal output is connected to transmitter 21 for the timely triggering thereof.

Also included in memory and synchronizing circuit are ramp generators which are triggered by the master oscillator to produce the sweep voltage waveforms to cause the current variations in sweep coils 28 and 29 and thereby deflect the focused beam of cathode ray tube 31, as will be presently explained. A core memory circuit is also contained within memory and synchronizing circuitry 26 and stores the input from scanner 25 and permits it to be read out at a much faster rate as determined by the scan rate of the sweep controlling ramp generators.

The component parts of the system, transmitter 21, transducer 22, hydrophones 23, receiver 24, scanner 25, and memory and synchronizing circuit 26, thus far describe conventional and commonly understood components of prior art systems. In the system of the invention they function in their intended and well understood fashion to produce the functions commonly attributed to them. Although they are complex circuits in themselves and accordingly subject to improvements they are regarded as state-of-the-art units in the subject system and may be selected from the available designs by persons versed in the art and modified thereby, if required, in accordance with the normal scope of activities of such an artisan.

A magnetic sweep generator 27 is triggered by memory and synchronizing circuit 26. Sweep generator 27 is connected to sweep coils 28 and 29 for the energization thereof. Coils 28 and 29 are held in cooperating relationship to cathode ray tube 31 to provide horizontal and vertical beam deflection therefor, respectively.

Direct coupled video amplifier 32 is connected to memory and synchronizing circuit 26 to receive the video signal output therefrom and increase its amplitude to a value required by cathode ray tube 31. The electronic focus of cathode ray tube 31 is obtained by a focus coil 33 mounted in cooperative relationship therewith. Regulated focus supply 34 supplies the electrical current to energize coil 33.

The operating potential for cathode ray tube 31 is supplied by a regulated high voltage supply 35, which will be more completely described subsequently.

Figure 3:
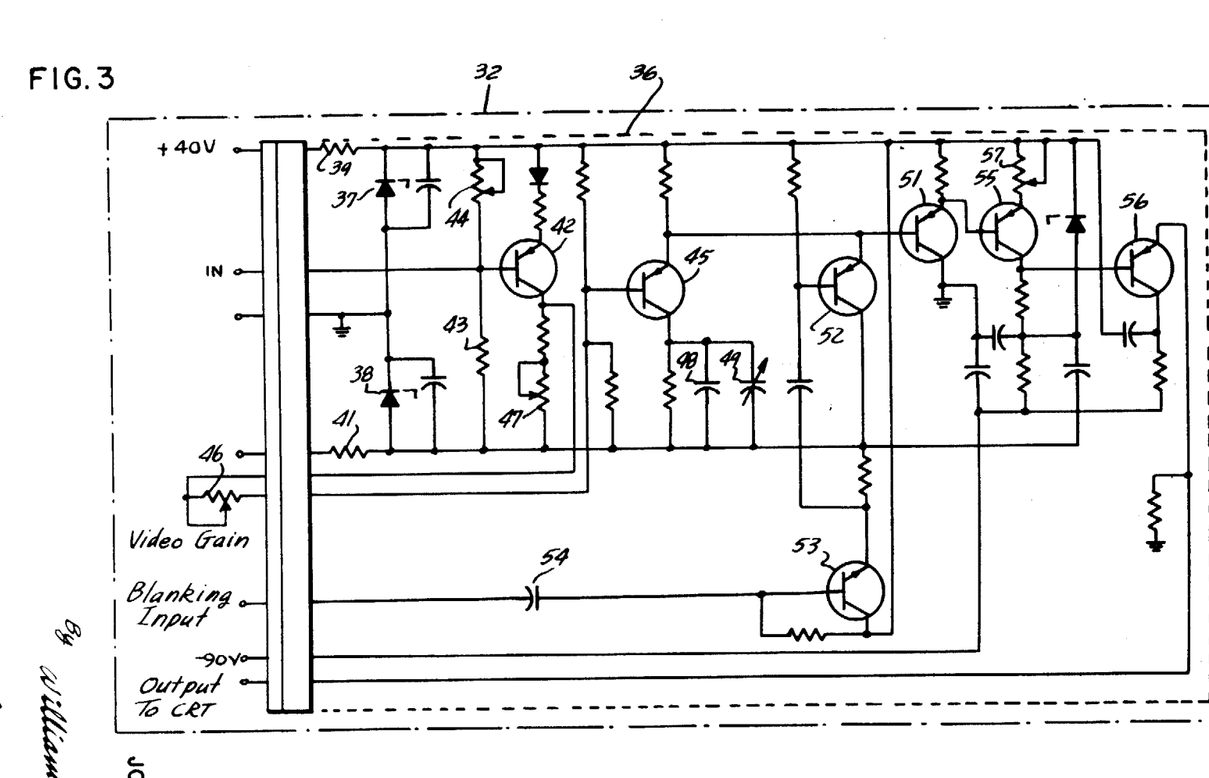
FIG. 3 is a schematic showing of the video amplifier component according to the invention.

Referring to FIG. 3, video amplifier 32 is seen to comprise a direct coupled circuit mounted, for the most part, on a plug in board 36. In order to handle the step waveform 14, which typically ranges in value from one tenth of a volt to 4 volts, a balanced power supply of plus and minus 10 volts is provided by the action of zener diodes 37 and 38 and divider resistors 39 and 41 across a 40 volt direct current input.

The first stage of signal amplification is provided by transistor 42. The video signals are fed to the base of transistor 42 which, in the absence of a signal, is biased at zero volts by the bleeder network comprising resistor 43 and adjustable resistor 44. The output from transistor 42 is fed to transistor 45 via gain control 46. Adjustable resistor 47 assures that there is no voltage drop across gain control 46 in the absence of a signal. Capacitors 48 and 49 in the collector circuit of transistor 45 are high frequency compensation devices and capacitor 49 is adjusted to provide minimum rise time without overshoot.

The output of transistor 45 is taken from the collector and fed directly to the base of transistor 51 and the emitter of transistor 52. Transistor 52 and transistor 53 provide blanking of the video output when a negative pulse is fed to the base of transistor 53 via coupling capacitor 54.

Transistor 51 is configured as an emitter-follower and provides a degree of isolation between the output stage and the preceding amplifier stage, transistor 45. This isolation is necessary to prevent the high impedance offered by cathode ray tube 31 and the stray capacitance associated therewith from adversely affecting the linearity of the preceding stages of amplification.

The output stage comprises two transistors 55 and 56. In order to achieve the large voltage swing required to utilize the entire dynamic range of the cathode ray tube, a separate minus 90 volt power supply is used for the output stage. Adjustable resistor 57, like adjustable resistor 47, is used to provide zero signal out in the absence of an input signal.

The provisions of the symmetrical power supply, zero output adjustments, and plug in board construction characterize video amplifier 32. These features, in turn, permit video amplifier 31 to offer a wide dynamic range and maintain excellent frequency response in the lower frequency signal range. Together with the ease of service made possible by the semiconductor circuitry and its mounting, these features are a marked improvement in the multi-channel sonar ranging arts.

Figure 4:
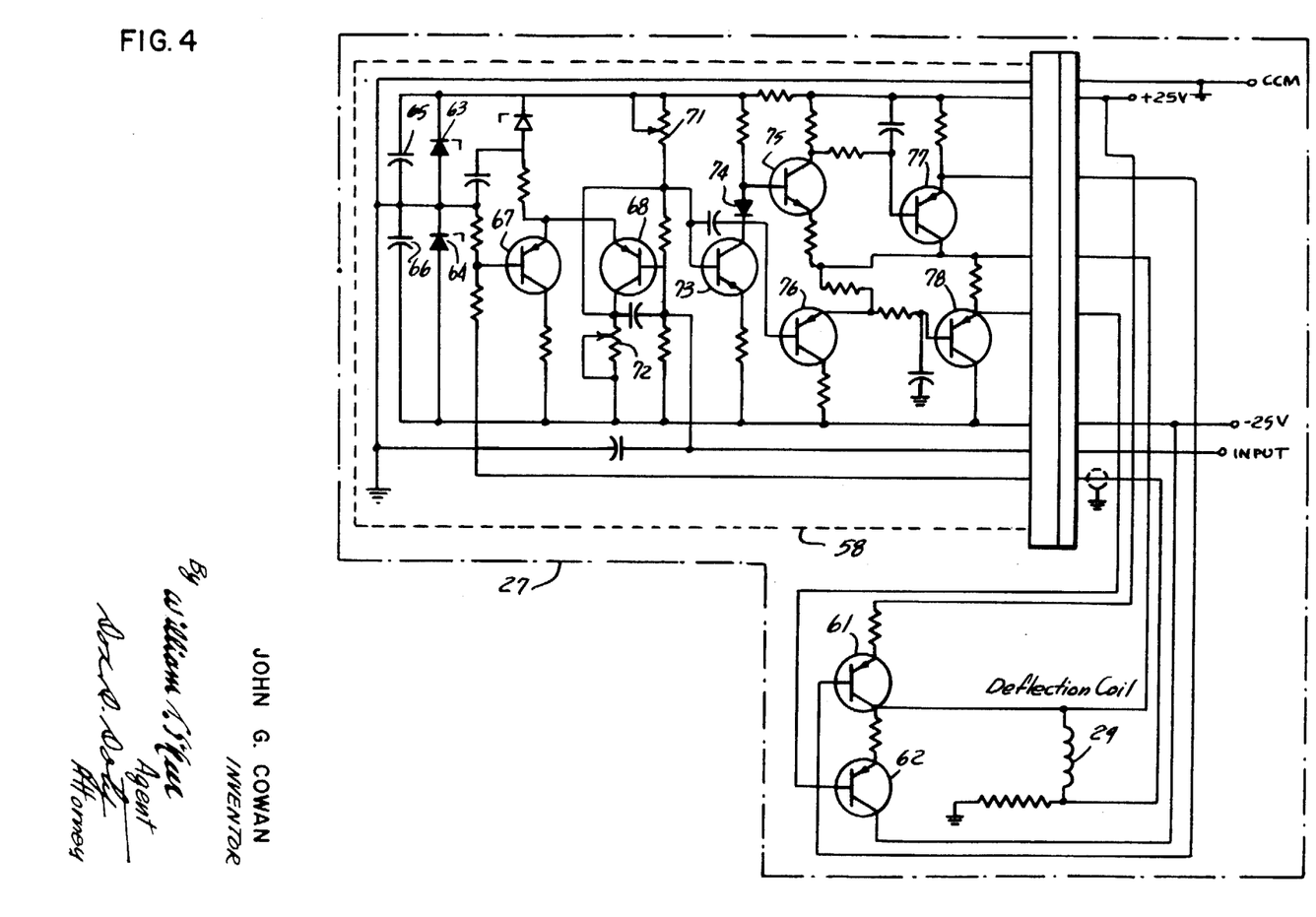
FIG. 4 is a schematic diagram of the magnetic sweep generator component according to the invention.

Referring to FIG. 4, sweep generator 27 will be described. Sweep generator 27 includes two identical sweep generating circuits. For purposes of simplicity, only a single circuit is shown. Like video amplifier 32, sweep generator 27 is a solid state circuit having the low power consumption components mounted on a plug in circuit board 58. The deflection coil 29, as previously noted, is mounted in fixed, cooperating relation to cathode ray tube 31, and output driving transistors 61 and 62 are mounted nearby on suitable heat sink means, as is commonly understood in the semi-conductor circuit fabrication arts.

The sweep circuitry operates from a symmetrical power supply of plus and minus 25 volts. This power is stabilized and regulated by zener diodes 63 and 64 and capacitors 65 and 66.

Transistors 67 and 68 are configured to comprise a differential amplifier. The base of transistor 67, the inverting input, is connected to resistor 67 which is in series with sweep coil 29. Resistor 69 is of a very low value, on the order of one ohm. The base of transistor 68, the non-inverting input, is connected to receive the sweep input signal from memory and synchronizing circuit 26. Adjustable resistors 71 and 72 in the base and collector circuit of transistor 68 are used to provide control of the frequency response and centering of the circuit. The output from the differential amplifier is connected to the base of transistor 73 which has diode 74 in the collector circuit thereof.

Transistors 75 and 76 receive base input signals from either side of diode 74 which, of course, preserves the independent biasing thereof. The outputs of transistors 75 and 76 drive transistors 77 and 78. Transistors 77 and 78 are connected as emitter followers to drive final output transistors 61 and 62.

Figure 5:
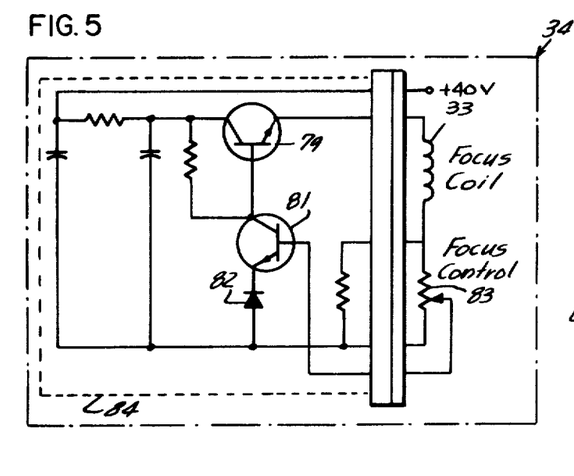
FIG. 5 is a schematic diagram of the regulated focus circuitry employed in the system of the invention.

Regulated focus supply 34 will be more fully disclosed with reference to FIG. 5. The regulated direct current flowing through focus coil 33 is obtained from a positive 40 volt supply. The current is regulated by a transistor 79 in series with focus coil 33. The conductance of transistor 79 is controlled by transistor 81 in response to the voltage taped from potentiometer 83, which is in series with focus coil 33, and the stabilized voltage provided by zener diode 82. As in the case of previously discussed circuitry, regulated focus supply 34 is, for the most part, mounted on a plug in circuit board. Potentiometer 83 is mounted accessible to the operator of the equipment and focus coil 33 is mounted on cathode ray tube 31.

Figure 6:
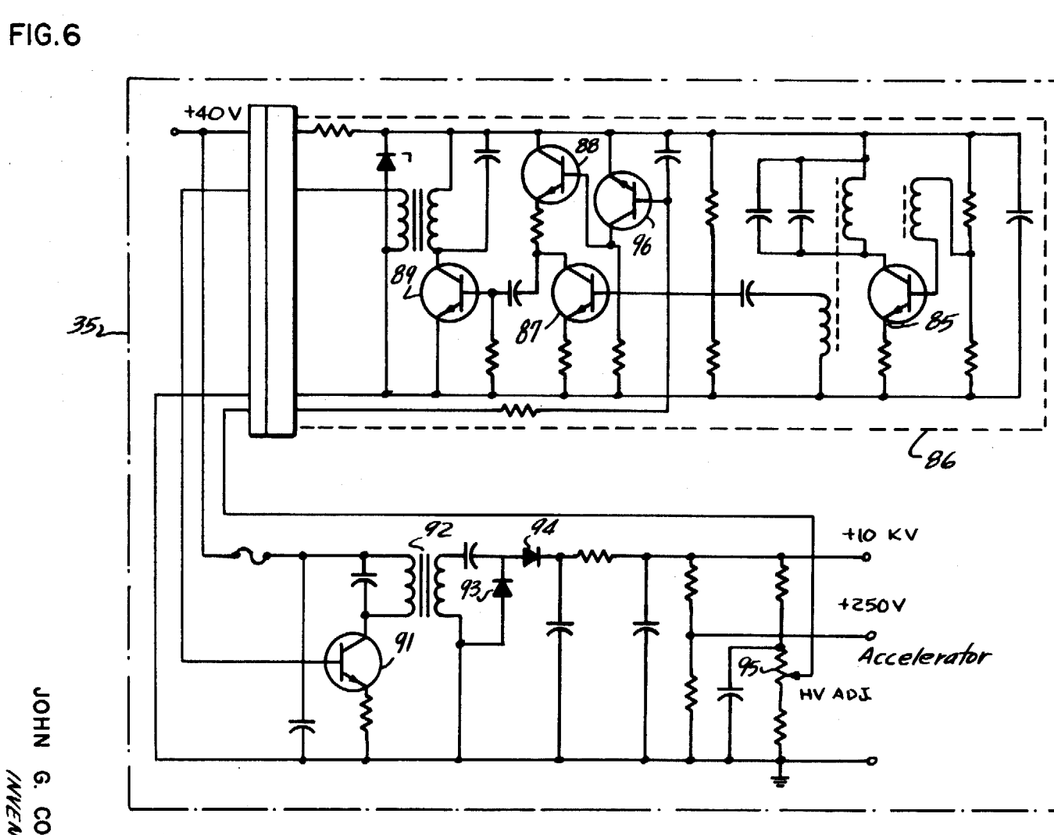
FIG. 6 is a schematic showing of the regulated high voltage supply employed in the system of the invention.

FIG. 6 is a schematic of high voltage power supply 35. Transistor 85, mounted on plug in circuit board 86, is connected as a tuned collector - tuned base oscillator. The operating frequency of the oscillator may be varied to a value deemed suitable, however, 100 kilohertz has proven satisfactory in developmental models. The output of transistor 85 is inductively coupled to the base of transistor 87 for amplification thereof. The amount of gain provided by transistor 87 is regulated by the conductance of transistor 88 in the collector circuit thereof. The output of transistor 87 is capacitively coupled to transistor 89 which, in turn, drives transistor 91. Step up transformer 92 in the collector circuit of transistor 91 steps up the voltage to a predetermined level, approximately 5 kilovolts in the developmental model. Diodes 93 and 94 are connected as a voltage doubler and double the output of transformer 92 to produce the required high voltage for cathode ray tube 31.

Regulation of this voltage to the desired level is obtained by the action of control transistor 88, as previously noted. Potentiometer 95 connected in a voltage divider across the high voltage output provides an adjustable sense voltage which is connected to the base of transistor 96. Transistor 96, in turn, is connected to the base of transistor 88 to control the conduction thereof, and, thereby, regulate the high voltage supplied to cathode ray tube 31.

MODE OF OPERATION

Referring to FIG. 2 the mode of operation of the system will be explained. In response to an electrical pulse from transmitter 21, ensonifying transducer 22 broadcasts a compressional wave of energy to travel through a predetermined volume. Solid objects within said predetermined volume reflect energy back to hydrophones 23. The plurality of hydrophones establish a plurality of angular reception sectors or zones and convert the impinging energy into electrical signals the time of arrival of which is indicative of the range to the objects. The plurality of signals are fed to multi-channel sonar receiver 24 where they are amplified to produce a plurality of outputs which are scanned by scanner 25 to produce waveform 14, FIG. 1c, which corresponds to the signals present in the output of multi-channel sonar receiver 24 at a given instant. The time-voltage output of scanner 25 is fed to memory and synchronizing circuit 26 where it is stored until the next cycle of scanner 25. The scanning rate of scanner 25 is chosen in accordance with the range resolution considerations of the system, together with the pulse repetition rate of transmitter 21.

Memory and synchronizing circuitry 26 produces signals to synchronize the sweep rates of cathode ray tube 31 with a video output which has repetition rates chosen in accordance with the phosphor persistance of cathode ray tube 31 and the scan rate of scanner 25. This permits the readout information to be scanned at greater rates than the ping-listen rate and the scanner 25's rate to thereby present a low flicker display or cathode ray tube 31.

As previously noted, sweep circuit 27 employs two sweep generator circuits, one for each sweep coil, as schematically illustrated in FIG. 4. The exact sweep rates are chosen to compliment the design considerations of the cathode ray tube, 30 kilohertz and 60 cycles for the horizontal sweep and the vertical sweep respectively. Each sweep circuit uses a degenerative feedback from resistor 69, which is in series with deflection coil 29, to preserve linearity. The feedback is affected by employing a differential amplifier having the non-inverting input, base of transistor 68, connected to the input ramp voltage, and the inverted input, base of transistors 67, connected to resistor 69. The linear amplification of the sweep voltage waveforms assures a uniform linear sweep of the desired linearity.

The video output from memory and synchronizing circuit 26 is amplified by direct coupled amplifier 32 and applied to the grid of cathode ray tube 31. Cathode ray tube 31 has a high dynamic range of display capability. This direct coupling of signals permits the system to respond to very low frequency signals as might be presented by a large bottom reverberation in several channels. Further the video amplifier has a wide dynamic range by virtue of its symmetrical power supply, previously explained, so that large magnitude returns may be handled, as well as smaller magnitude signals with a single gain setting. When coupled with a magnetic deflection, high dynamic range, low persistency display cathode ray tube, this amplifier produces a signal that is an exceptionally effective for displaying small target returns adjacent large returns.

The regulated high voltage power supply provides the operating voltage in such manner as to permit low cathode-to-grid potentials in the cathode ray tube, so that a direct coupled video amplifier may be employed in the system. Transistor 85, FIG. 6, oscillates to produce an alternating current voltage that is electronically amplified, then stepped up with transformer 92. A voltage doubler comprising diodes 93 and 94 double and rectify the voltage to arrive at the desired voltage, ten kilovolts. Regulation is obtained by regulating the gain of the electronic amplification of the alternating current. This gain regulation is accomplished by taping a sense voltage from a voltage divider comprised by potentiometer 95 and controlling the gain of transistor 87 therewith by using the sense voltage to alter the conduction of transistor 88 in the collector circuit of transistor 87.

In such a linear, wide dynamic range system, the focus of the cathode ray tube display must remain very consistent if the subtle shadings that the system is capable of is to be maintained. In the system of the invention, this regulation is obtained by the circuit shown in FIG. 5 and described above.

Variations in the current flowing in focus coil 33 cause a variation in the voltage taped from potentiometer 83. The taped voltage is compared with a voltage regulated by zener diode 82 by transistor 81 and used to bias transistor 79, also in series with focus coil 33, to restore the current to its desired value.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A sonar system comprising in combination:
   transmitter means for ensonifying a predetermined volume of water with acoustic energy;
   receiver means for converting acoustic energy reflected from objects within said predetermined volume of water into a plurality of electrical echo signals corresponding to a plurality of reception channels angularly oriented with respect to one another;
   scanning means connected in circuit with said receiver means for periodically scanning said plurality of electrical signals at a first scanning rate to develop a time varying signal output therefrom;
   memory and synchronizing circuit means connected to said scanning means for storage of said output therefrom, and for producing video output signals from said stored signals corresponding thereto but at a second scanning rate different from said first scanning rate;
   direct coupled video amplifier means connected to said memory and synchronizing circuit means for receipt of said video signals therefrom for amplifying said video signals, including those of very low frequency, to a predetermined level;
   cathode ray tube means having a low persistency phosphor face and electron beam generating means directly connected to said direct coupled video amplifier means, so as to receive said amplified video signals for display thereof as visual light patterns on said phosphor face thereof;
   deflection coil means mounted in cooperating relation to said cathode ray tube means for deflection of the electron beam thereof;
   sweep circuit means connected between said deflection coil means and said memory and synchronizing circuit means for supplying a deflection current to the former in response to signals supplied by the latter;
   focus coil means mounted in cooperating relationship to said cathode ray tube means for converging said electron beam therein to a discrete spot on the phosphor face thereof;
   focus circuit means connected to said focus coil means for supplying a regulated current thereto; and
   regulated high voltage power supply means connected to said cathode ray tube for generating and regulating electrical operational potentials therefor.

2. A sonar system according to claim 1 wherein said direct coupled video amplifier means comprises:
   first solid state amplifier means connected to receive said video signals for increasing the magnitude thereof;
   first adjustable means connected in circuit with said first solid state amplification means for balancing the output thereof to zero in the absence of an input signal thereto;
   second solid state amplifier means for further increasing the magnitude of said video signals;
   adjustable resistor means connected between said first and second solid state amplifier means for controlling the amount of signal coupled therebetween; and
   adjustable capacitor means connected in circuit with said second solid state amplifier means for adjusting the high frequency response thereof to avoid overshoot in square wave response.

3. A sonar system according to claim 2 in which said video amplifier further comprises:
   third solid state amplifier means connected to said second solid state amplifier means for further increasing the magnitude of the video signals applied thereto; and
   solid state blanking means connected between said second and third solid state amplifier means for selectively interrupting the video signal transmitted therebetween in response to electrical signal applied thereto.

4. A sonar system according to claim 1 further comprising sense resistance means connected to said deflection coil means and said sweep circuit means for developing an electrical sense signal indicative of the current flowing in said deflection coil means and for applying said sense signal to said sweep circuit means.

5. A sonar system according to claim 4 in which the aforesaid sweep circuit means includes a differential amplifier having one input connected to said sense resistance means and another input connected to the aforesaid memory and synchronizing circuit, so as to receive sweep signals therefrom for linearly amplifying said sweep signals fed thereto.

6. A sonar system according to claim 1 wherein said regulated high voltage power supply means comprises:
   oscillator means for producing an alternating current output signal;
   voltage amplifier means connected to the output of said oscillator means for increasing the magnitude of said alternating current output signal to a predetermined level; and
   voltage doubler rectifier means connected to the output of said voltage amplifier means for changing said amplified alternating current output to a high voltage direct current output.

7. A sonar system according to claim 6 wherein said regulated high voltage power supply further comprises:
   voltage divider means connected across the high voltage direct current output for obtaining a sense voltage therefrom;
   variable impedance means connected to said voltage divider means so as to receive said sense voltage therefrom, and connected to said voltage amplifier means so as to regulate the gain thereof in response to variations in said sense voltage.

8. In a sonar system, including transmitter means for insonifying a predetermined volume of water with acoustic energy; receiver means for converting acoustic energy reflected from objects within said predetermined volume of water into a plurality of electrical echo signals corresponding to a plurality of reception channels angularly oriented with respect to one another; scanning means connected in circuit with said receiver means for periodically scanning said plurality of electrical signals at a first scanning rate to develop a time varying signal output therefrom; memory and synchronizing circuit means connected to said scanning means for storage of said output therefrom and for producing video output signals from said stored signal corresponding thereto but at a second scanning rate different from said first scanning rate; the improvement comprising:
   cathode ray tube display means having electron beam forming capabilities cooperating with a high dynamic range and a low persistence phosphor display surface for display of wide dynamic range video signals;
   electromagnetic deflection means in cooperating relationship to said cathode ray tube display means for scanning movement of the electron beam thereof, so as to produce a roster on said display surface;
   direct coupled video amplifier means suitably mounted on modular, removable support means and electrically connected to said cathode ray tube display means for supplying of amplified video signals thereto;
   regulated high voltage supply means electrically connected to said cathode ray tube for supplying operating potentials thereto; and
   focusing means comprising focus coil means in cooperating relation to said cathode ray tube display means and regulated focus power supply means electrically connected to said coil means and cooperating therewith for focusing the electron beam of said cathode ray tube display means on the display surface thereof.

9. The multi-channel sonar of claim 8 further comprising:
   magnetic sweep generator means electrically connected to said electromagnetic deflection means so as to supply current signals thereto and to receive sense signals therefrom for producing predetermined beam deflections of said electron beam.

10. The multi-channel sonar of claim 9 wherein said magnetic sweep generator means comprises differential amplifier means having the inverting input thereof connected to receive said sense signals for increasing the linearity of the output of said sweep generator means.

* * * * *